Sept. 12, 1933.    L. F. MacKENZIE ET AL    1,926,748
METHOD FOR TESTING THE PHYSICAL CONDITION OF HUMAN BEINGS
Filed April 27, 1929
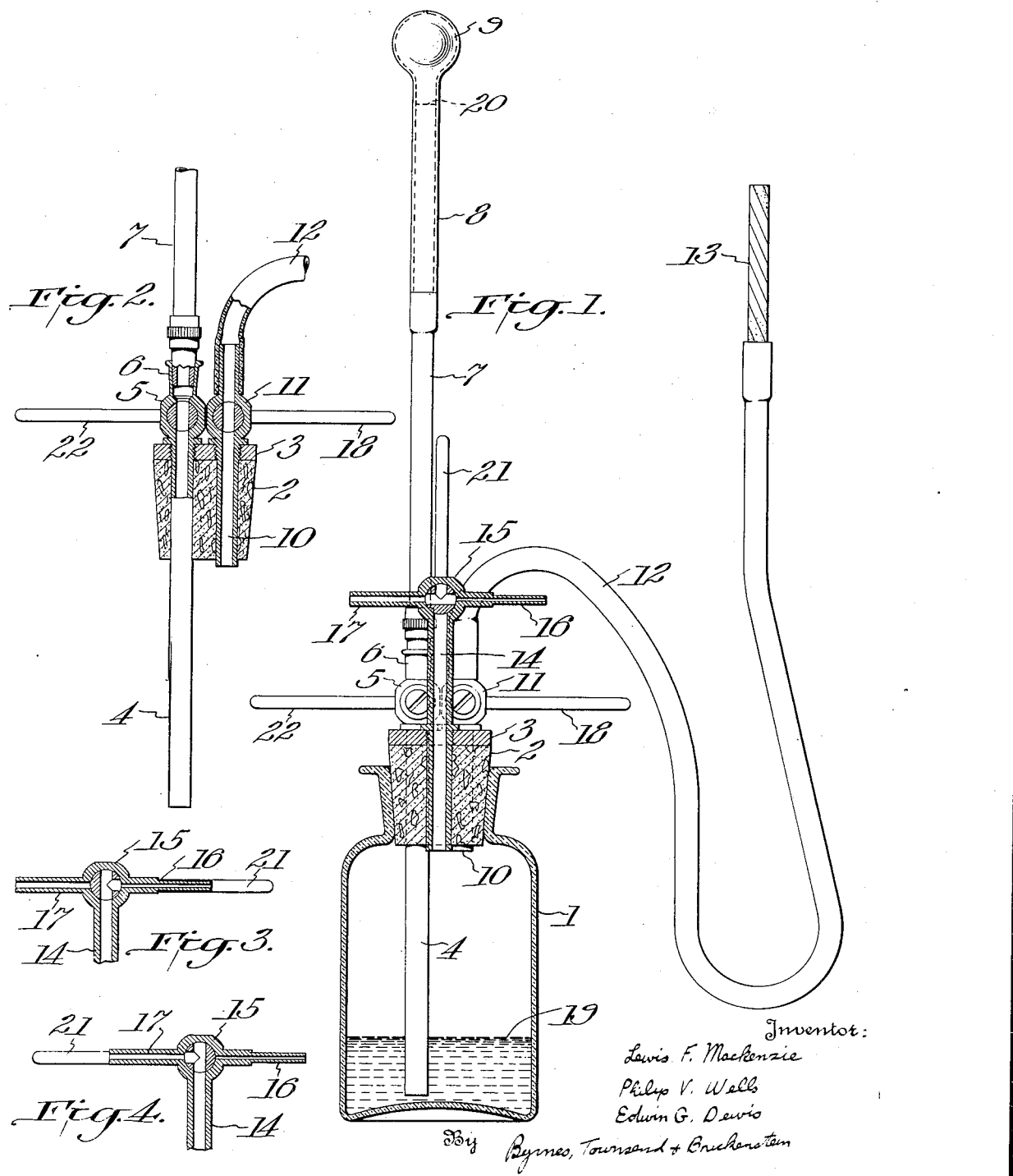

Patented Sept. 12, 1933

1,926,748

UNITED STATES PATENT OFFICE 1,926,748

METHOD FOR TESTING THE PHYSICAL CONDITION OF HUMAN BEINGS

Lewis F. MacKenzie, Newark, Philip V. Wells, Princeton, and Edwin G. Dewis, Asbury Park, N. J.

Application April 27, 1929. Serial No. 358,660

3 Claims. (Cl. 128—2)

This invention is an improvement in methods for the study of physical efficiency; it is especially adapted for enabling the individual under test to blow at a constant rate and at a standard intrapulmonary pressure, both rate and pressure so chosen that the blood-pressures rise considerably above their rest-values before the subject feels compelled to stop blowing. The apparatus of the invention, therefore, may be called a "flarimeter", from the Latin verb flare,—"to blow". The flarimeter provides a convenient method of subjecting the circulatory and respiratory systems to accurately controlled conditions such that the responses in the systolic and in the diastolic pressures, in the pulse rate and the duration of the blow, may be used to measure the functional efficiency of the circulation. The apparatus of the invention is more particularly claimed in our U. S. Patent 1,857,732, dated May 10, 1932.

The flarimeter is designed to control the type, magnitude and duration of the physical effort, to cause the blood-pressures to rise slowly but sufficiently for the examiner to observe the maximum systolic and diastolic pressures, the pulse rate and the total length of the blow with accuracy and ease. The apparatus is simple, durable, reproducible, and inexpensive in construction, so that the method is especially adapted to the conditions of medical practice.

The measurement of the systolic and diastolic pressures and the pulse rate of an individual at rest may suggest certain pathological conditions in the circulatory system, but important additional information is given by their response when the circulation is under load. Muscular exercises, such as bending, ascending a flight of stairs, lifting weights, etc., are often used for this purpose, but such effort is difficult to standardize and is not always available or convenient. Forced expiration (after full inspiration) provides the most convenient means of placing the circulatory system under a standard load. To produce sufficient responses in systolic and diastolic pressures, however, the rate of expiration must be controlled so as to produce a cumulative effect. It is only in the latter stages of the sustained expiration that the systolic and diastolic pressures rise considerably above their values when the subject is at rest. If the expiration is too rapid or too slow the response is not as pronounced as it is at the optimum rate, which we have found to be between 25 and 50 cubic centimeters of air per second when the intrapulmonary pressure is at 20 mm. of mercury. This pressure has been found to be most satisfactory. Heretofore such tests have been made either through large orifices, at many times the optimum rate, or when holding the breath which is at rate zero. The maximum systolic response is obtained with small orifices.

With large orifices the emptying of the lungs limits the duration of the blow, and our instrument is provided with an orifice allowing 200 cc. of air to flow per second (at 20 mm. pressure drop) to be used in measuring the vital capacity of the lungs. The maximum length of blow (in seconds), multiplied by 0.2, gives the vital capacity in liters. The only systolic response with large orifices which is sufficiently pronounced to be interesting is the sudden spurt at the end of the blow, largely mechanical in origin. The systolic responses with small orifices, however, are of quite a different nature, being due chiefly to the accumulation of carbon dioxide and depletion of oxygen in the blood because the respiration is suspended. Such slow changes are obviously better suited to precise measurement than the rapid fluctuations in systolic pressure resulting from violent movements of the thorax and diaphragm.

To show the effect of the size of orifice upon the maximum systolic response (maximum minus rest-value) during the longest possible blow at 20 mm. intrapulmonary pressure, the average values of several trials on each of five different orifices, covering the entire range of small orifices, have been compared. Twenty normal adult males gave the averages 16, 24, 27, 25 and 13 mm. ± 2 mm., respectively, for the orifices having rates of flow 0, 24, 36, 48, and 72 cc. per second, showing a maximum response for the rate 36 cc. per second. This optimum orifice permits one-half the vital capacity of the lungs to be expired (the 72 orifice about seven eighths) before the impulse to inspire stops the blow. This fact may explain the maximum response, for at "half-tide" the subject is muscularly at ease, and so can concentrate all his will power to resist the respiratory hormone. When holding the breath with the lungs full of air, the distension of the thorax and diaphragm produces muscular fatigue, and this probably assists in breaking the will before the maximum rise in blood-pressure has accumulated. Obviously, the factors which end the blow are not the same with small as with large orifices. Indeed, we have found in a series of over one hundred normal adults that the older subjects on the average cannot blow as long as the younger ones through the 200 orifice, but on the contrary can blow somewhat longer than the younger ones through the 36 orifice.

The apparatus comprises a compression chamber with four openings: (1) into a flexible tube connected with a mouthpiece through which the subject blows; (2) a small orifice which regulates the rate of expiration so that a maximum response in blood pressure is produced; (3) a large orifice to permit of a vital capacity measurement; and (4) into a sensitive manometer to indicate the intrapulmonary pressure. The volume of air expired is proportional to the time at the standard pressure, and this time is most simply measured by the second-hand of a watch in a manner already familiar to doctors in observing the pulse-rate. The blood-pressures are measured as usual by a sphygmomanometer.

The manometer which indicates the intrapulmonary pressure can be of aneroid type, but we prefer the simple water-column, which can be reproduced exactly to specification, never requires recalibration, and is sufficiently sensitive without being mechanically unreliable. Moreover, as the air expired from the lungs is saturated with water vapor, a water manometer is most appropriate. The duration of the blow can be recorded by a pen actuated by the manometer on a paper disc or tape moved at constant rate by a clock mechanism, but the conditions of medical practice require the utmost simplicity and portability. The doctor's watch is already at hand, most convenient and quite reliable. The examiner can use his own sphygmomanometer. The mercury type of sphygmomanometer possesses the distinct advantage of enabling the examiner while observing it to glance at the water manometer used to indicate the intrapulmonary pressure without moving his head, when the water manometer is mounted in front of the subject for him to watch.

To enable others to clearly understand and use the invention, the invention will be described for the purpose of illustration with reference to the accompanying drawing, in which:

Fig. 1 represents a front elevation of the apparatus in partial section;

Fig. 2 represents a rear elevation of a portion of the apparatus shown in Fig. 1; and Figs. 3 and 4 represent two other positions of the two way valve of the apparatus than that shown in Fig. 1.

In the drawing, 1 is a wide mouth glass bottle forming a compression chamber. It is fitted with a rubber stopper 2 having a metal cap 3 and provided with three holes.

One of the holes is fitted with a tube 4 leading nearly to the bottom of the chamber and fitted at its upper end with a valve 5 and a socket 6 adapted to receive the lower end of a manometer tube comprising a lower metallic portion 7 and an upper glass portion 8 open at the top to the atmosphere. The bulb 9 serves to prevent any loss of liquid by overflowing.

Another of the holes is fitted with a tube 10 carrying a valve 11. A rubber tube 12 is fitted to the upper end of tube 10 and the other end of the rubber tube carries a detachable mouthpiece 13.

The third hole is fitted with a tube 14 provided at its upper end with a two way stopcock 15 adapted to close the chamber from the exterior as shown in Fig. 1, or to open the chamber to the exterior, through the small orifice 16 as shown in Fig. 3, or through the large orifice 17 as shown in Fig. 4.

The subject takes the mouthpiece 13 in his right hand and inspiring until his lungs are as full as possible, inserts the mouthpiece into his mouth and blows through the rubber tube 12, the entrance valve 11 (which is open when the lever 18 is horizontal to the right) into the compression chamber 1, thereby forcing the water 19 in the bottom of the compression chamber up the manometer tube 4 until the water level is at the index mark 20. Air then escapes from the large orifice 17 (when the lever 21 of the two way valve 15 is horizontal to the left) at the constant rate of 200 cc. per second until he has expired his maximum. The examiner signals to the subject "Inspire!" and "Blow!" at the proper moments so that the duration of the blow can be accurately and easily measured by the second-hand of his watch. Three trials are usually sufficient to obtain a maximum length of blow in seconds which, when multiplied by 0.2, gives a value within 5% of the true vital capacity.

The lever 21 is then turned until horizontal to the right, thus opening the valve 15 to the small orifice 16. The subject inspires fully again on signal and blows as long as possible through the small orifice at 36 cc. per second, holding the water in the manometer exactly at the index level (indicating an intrapulmonary pressure of 272 mm. of water, equal to 20 mm. of mercury). In normal subjects the systolic pressure drops considerably below the rest-value during the first 10-20 seconds of the blow because of the increased intrathoracic pressure with 20 mm. positive intrapulmonary pressure, and then rises steadily to values considerably above the rest-value, at the end of the blow. The examiner follows these changes with the sphygmomanometer cuff attached to the subject's left arm, and times the various phases. When an assistant is available, the examiner can concentrate on the pressure changes, stating them as they occur to be recorded by the assistant who also notes the times.

The responses in diastolic pressure and pulse rate can be followed in a similar manner. In normal subjects the diastolic rises during the initial drop in systolic, then falls somewhat for a few moments before the final rise which parallels the systolic until the end of the blow, unless the pulse rate increases as it does somewhat in nervous subjects toward the end if the blow is protracted by main force. The diastolic never continues to rise after the subject stops blowing, as often happens with the systolic, but drops abruptly and remains below its rest-value for an appreciable interval of time, returning gradually as the effects of the test wear off. Instead of waiting for this return, however, the test is repeated on a fixed time schedule, which accentuates the responses in successive tests, so that the rest-values progress in a significant manner. The pulse rate is not markedly accelerated by this test as it is by physical exercise, probably because little lactic acid accumulates in the muscles. The excess of carbon dioxide and lack of oxygen in the blood disappear quickly as soon as respiration is resumed, while after exercise carbon dioxide continues in excess until the lactic acid is consumed. We, therefore, believe that the flarimeter tests will be found to manifest signs of physical impairment different from those shown by exercise tests.

The mouthpiece 13 of the flarimeter can be of glass or metal, but we prefer pressed paper, a new one for each subject, for sanitary reasons, and because of their flexibility which relieves muscular fatigue of the lips. The long levers for manipulating the valves are arranged so that the case in which the instrument is protected cannot be closed when the valves are open. The small bulb 9 at the top end of the glass manometer tube 8 prevents the water from overflowing before the subject can adjust his intrapulmonary pressure to the index level. The water can be colored with a stainless colorant, but the pressure level is easily seen without it. The overall height of the aparatus need not exceed 30 cm. when in operation. For convenience, however, we have made the upper glass portion of the manometer tube detachable, which reduces the height of the closed case to very convenient proportions for carrying in the doctor's bag or even in his pocket. In the following claims the term variations in blood pressure is intended to include the systolic and diastolic pressures, pulse rate and pulse form.

We claim:

1. A method of testing the physical condition of human beings which comprises measuring the variations in blood presures of a subject while the subject is expiring at a controlled constant rate of from about 25 to about 50 cc. per second and at a controlled constant intrapulmonary pressure.

2. A method of testing the physical condition of human beings which comprises measuring the variations in blood pressures of a subject while the subject is expiring at a controlled constant rate of from about 25 to about 50 cc. per second and at a controlled constant intrapulmonary pressure of about 20 mm. of mercury.

3. A method of testing the physical condition of human beings which comprises measuring the variations in blood pressures of a subject while the subject is expiring at a controlled constant rate of about 36 cc. per second and at a controlled constant intrapulmonary pressure.

LEWIS F. MacKENZIE.
PHILIP V. WELLS.
EDWIN G. DEWIS.